US009690640B2

(12) United States Patent
Sade et al.

(10) Patent No.: US 9,690,640 B2
(45) Date of Patent: Jun. 27, 2017

(54) RECOVERY FROM MULTIPLE DATA ERRORS

(71) Applicant: Intel Corporation, Santa Clara, CA (US)

(72) Inventors: Raanan Sade, Kibutz Gvat (IL); Ron Gabor, Ra'anana (IL); Deep K. Buch, Folsom, CA (US); Theodros Yigzaw, Sherwood, OR (US); Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/038,334

(22) Filed: Sep. 26, 2013

(65) Prior Publication Data

US 2015/0089280 A1    Mar. 26, 2015

(51) Int. Cl.
*G06F 11/00*    (2006.01)
*G06F 11/07*    (2006.01)
*G06F 11/08*    (2006.01)

(52) U.S. Cl.
CPC ........ *G06F 11/073* (2013.01); *G06F 11/0793* (2013.01); *G06F 11/08* (2013.01)

(58) Field of Classification Search
CPC .... G06F 11/073; G06F 11/0793; G06F 11/08; G11B 20/1833
USPC .............................. 714/6.11, 6.12
See application file for complete search history.

(56) References Cited

U.S. PATENT DOCUMENTS

| | | | | |
|---|---|---|---|---|
| 5,337,318 | A * | 8/1994 | Tsukakoshi | G11C 29/56 714/704 |
| 5,535,328 | A * | 7/1996 | Harari et al. | 714/6.32 |
| 6,594,788 | B1 * | 7/2003 | Yasui | G11C 29/56 714/710 |
| 2003/0208704 | A1 | 11/2003 | Bartels et al. | |
| 2004/0230865 | A1 | 11/2004 | Balazich et al. | |
| 2005/0165737 | A1 * | 7/2005 | Tomida | G06F 13/18 |
| 2006/0212778 | A1 * | 9/2006 | Wheeler | G06F 11/106 714/764 |
| 2010/0070829 | A1 | 3/2010 | Vishne et al. | |
| 2010/0241899 | A1 | 9/2010 | Mayer et al. | |
| 2013/0159797 | A1 * | 6/2013 | Peng et al. | 714/718 |

FOREIGN PATENT DOCUMENTS

| | | |
|---|---|---|
| TW | 201329697 A | 7/2013 |
| WO | 2009003995 A1 | 1/2009 |

OTHER PUBLICATIONS

International Search Report and Written Opinion dated Dec. 22, 2014 for PCT/US2014/056993.

* cited by examiner

*Primary Examiner* — Yair Leibovich
(74) *Attorney, Agent, or Firm* — Lowenstein Sandler LLP

(57) ABSTRACT

Mechanisms for handling multiple data errors that occur simultaneously are provided. A processing device may determine whether multiple data errors occur in memory locations that are within a range of memory locations. If the multiple memory locations are within the range of memory locations, the processing device may continue with a recovery process. If one of the multiple memory locations is outside of the range of memory locations, the processing device may halt the recovery process.

17 Claims, 11 Drawing Sheets

RECOVERY FROM MULTIPLE DATA ERRORS

TECHNICAL FIELD

Embodiments described herein generally relate to processing devices and, more specifically, relate to error recovery.

BACKGROUND

Processing devices access memory when performing operations and/or when executing instructions of an application. For example, a processing device may read data from a memory location and/or may write data to a memory location when adding two numbers (e.g., may read the two numbers from multiple memory locations and may write the result to another memory location). Errors may occur in memory when a processing device tries to access data from a location in memory. For example, a data error (e.g., an error in the data at a memory location) may be detected when the processing device tries to access data in the memory location.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
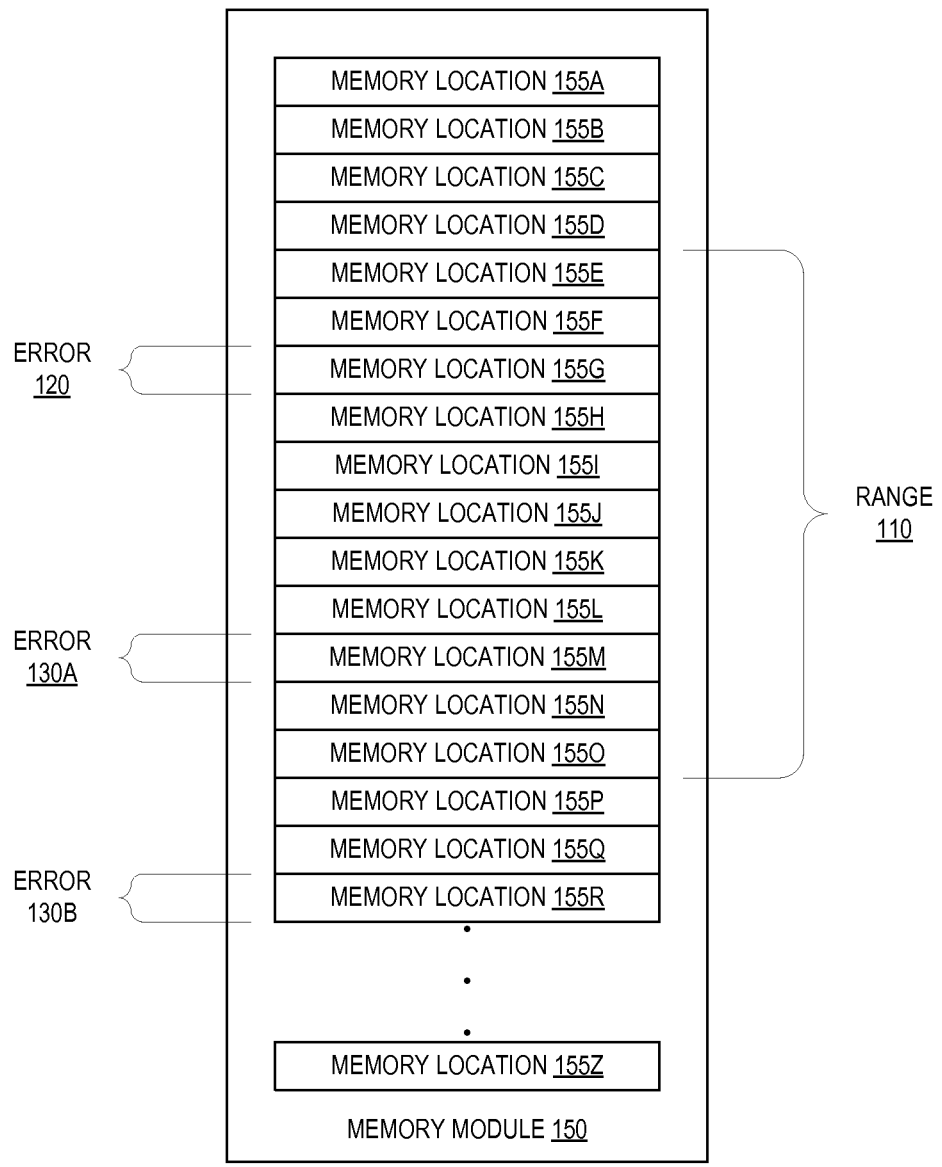
FIG. 1 is a block diagram of a memory module, according to one embodiment of the disclosure.

As discussed above, a processing device may access memory when performing operations and/or when executing instructions of an application. Errors may occur in a memory location when a processing device tries to access data from the memory location. A processing device may attempt to recover from the error (e.g., the data error) by initiating a recovery process. The recovery process may store information associated with the error and may allow a computing device to continue operating. However, a processing device typically is not able to handle multiple data errors that occur simultaneously.

Embodiments of the disclosure provide for systems and methods of handling multiple data errors that occur simultaneously. A processing device may determine whether multiple data errors occur in memory locations that are within a range of memory locations. If the multiple memory locations are within the range of memory locations, the processing device may continue with a recovery process. If at least one of the multiple memory locations is outside of the range of memory locations, the processing device may halt the recovery process. The ability to process and/or analyze multiple data errors allows the computing device to continue operating when multiple data errors occur instead of halting execution or operations (e.g., instead of crashing).

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

FIG. 1 is a block diagram of a memory module 150, according to one embodiment of the disclosure. The memory module 150 may be one or more components, gates, processing logic, circuits, and/or other hardware that may store data. In one embodiment, the memory module 150 may be a random-access device (such as a random-access memory (RAM)) that allows stored data to be accessed directly in any random order. Examples of random access devices (or memories) may include, but are not limited to, dynamic RAM (DRAM) and static RAM (SRAM). In one embodiment, DRAM may be a type of random-access memory that stores each bit of data in a separate capacitor within an integrated circuit. Examples of DRAM include, but are not limited to, double data rate synchronous RAM (DDR SDRAM), double data rate type 2 synchronous RAM (DDR2 SDRAM), and double data rate type 3 synchronous RAM (DDR3 SDRAM), etc. In another embodiment, SRAM may be a type of memory that uses latching circuitry to store each bit of data. In one embodiment, the memory module 150 may be a volatile memory. A volatile memory may be a memory that requires power to maintain the stored data or information. The memory module 150 may also be referred to as main memory. In one embodiment, the memory module 150 may be a cache (e.g., a memory that may store recently accessed data). The cache may be included as a component and/or as part of a processing module (e.g., processor cache). The cache may also be external to a processing module. In another embodiment, the memory module 150 may include one or more registers of a processing module. The one or more registers may be processing logic that stores data (e.g., operands, values, etc.) used by the processing module.

The memory module 150 includes multiple memory locations 155A through 155Z. As discussed below in conjunction with FIG. 2, a processing module may execute one or more applications (e.g., execution instructions of one or more applications). As the processing module executes instructions, the instructions may read, write and/or access data stored in one or more of the memory locations 155A through 155Z. In one embodiment, errors may occur when the processing module accesses one or more of the memory locations 155A through 155Z. These errors may include, but are not limited to, errors in data stored at a memory location, system bus errors (e.g., errors that occur when transferring data between components via a data bus), error correction code (ECC) errors (e.g., errors that occur when using an error correction code for data in a memory location), parity errors (e.g., errors that occur in parity bits of data in a memory location), translation lookaside buffer (TLB) errors (e.g., errors that occur in a TLB), and/or cache errors (e.g., errors that occur in a cache). The errors may also be referred to as data errors. The data errors may be caused by various factors such as improper installation of a component (e.g., improper installation of a DRAM chip), overclocking a processing module (e.g., increasing the voltage of a processor), environmental factors (e.g., alpha particles, cosmic ray hits, temperature, etc.), faulty components (e.g., a faulty DRAM chip), etc.

In one embodiment, when an error occurs, the processing module may analyze the error and may determine whether the data error is correctable (e.g., whether the data error can be corrected by hardware, such as the processing module or the memory module). If the data error is correctable, the processing module may correct the data error and may resume executing instructions (e.g., the processor may resume operation). If the data error is not correctable (e.g., the data error is uncorrectable) the processing module may initiate a recovery process to recover from the error. In one embodiment, the recovery process may include obtaining, recording and/or storing data associated with the error. For example, the processing module may record one or more of an address of the memory location that was accessed when the data error occurred (e.g., memory location 155G), an address of the instruction that accessed the memory location (e.g., an instruction address or an instruction pointer), and/or the contents of the memory location (e.g., the data stored in the memory location). During the recovery process the processing module may also communicate with firmware (e.g., a basic input/output system (BIOS), a unified extensible firmware interface (UEFI), etc.), an operating system (OS), a virtual machine monitor (VMM), and/or the application during the recovery process (as discussed below in conjunction with FIG. 2). This may allow the firmware and/or OS to perform additional recovery operations and/or processes.

In one embodiment, the recovery process may include the timeframe, operations, and/or actions performed by the processing module, firmware, OS, and/or VMM starting from the point in time in which the error 120 (e.g., the first error) is detected to the point where the processing module allows and/or instructs the firmware, OS and/or VMM to recover from the error (e.g., by un-mapping memory, by halting a thread or application, by restarting a VM, etc.). In another embodiment, the recovery process may include the timeframe, operations, and/or actions performed by the processing module, firmware, OS, and/or VMM starting from the point in time in which the error 120 (e.g., the first error) is detected to the point where the firmware, OS and/or VMM complete their corresponding error recovery processes and/or operations.

In one embodiment (not shown in the figures), the processing module may also work in conjunction with a virtual machine monitor (VMM). A VMM may be processing logic (e.g., hardware, software, or a combination of both) that emulates the underlying hardware of the computing device for a virtual machine. A virtual machine (VM) may be a software implementation of a physical machine (computer) that includes its own operating system (referred to as a guest operating system) and executes application programs. The VMM allows multiple VMs to operating on a computing device by emulating the hardware of a computing device so that the operation of the virtual machine is transparent to the guest operating system and the user of the computer. The computing device allocates a certain amount of its resources to each of the virtual machines, and the VMM multiplexes its underlying hardware among the virtual machines. Each virtual machine is then able to use the allocated resources to execute its guest operating system and applications. The VMM may be s separate component of a computing device and/or may be part of the OS of the computing device. The VMM may also be referred to as a hypervisor. In one embodiment, the VMM may also perform recovery operations and/or processes when an error occurs. For example, the VMM may halt or terminate one or more VMs or may restart one or more VMs.

As illustrated in FIG. 1, an error 120 (e.g., a data error) occurs when the processing module accesses memory location 155G. The processing module may determine that the error 120 is uncorrectable but is recoverable (e.g., the data error can be addressed without halting the operation of a computing device and/or restarting a computing device) and may initiate a recovery process. In one embodiment, error 130A may occur when the processing module accesses memory location 155M during the recovery process (e.g., while recovering from the error 120 or while the recovery process is being performed). For example, the processing module may be executing multiple instructions simultaneously and a second instruction may also result in a data error when the processing module accesses the memory location 155M. The error 130A may occur while the processing system, firmware, OS, and/or VMM are still recovering from the error 120 (e.g., while recovering from the first error or while the recovery process is being performed). The processing module may determine whether the error 130A is also recoverable. If the error 130A is also recoverable, the processing module may determine whether the memory locations 155G and the memory locations 155M are both within a range of memory locations 110. Because both memory location 155G and the memory location 155M are within the range of memory locations 110, the processing module may continue with the error recovery process. For example, the processing module may continue to store a memory address and/or data of the memory location 155G and may continue to communicate with firmware and/or an OS so that the firmware and/or OS may also recover from the error. The processing module may also store information about the errors in one or more data stores in the computing device that may be external to the processing module. For example, the processing module may store information about the errors (e.g., a memory address, an instruction address, data from a memory location, etc.) in a hard disk or other memory. Although the range of memory locations 110 is illustrated as consecutive memory locations, it should be understood that in other embodiments, the range of memory locations 110 may include a set or a block of non-consecutive memory locations.

In another embodiment, error 130B may occur when the processing module accesses memory location 155R during the recovery process (e.g., while recovering from the error 120). The error 130B may occur while the processing system, firmware, OS, and/or VMM are still recovering from the error 120 (e.g., while recovering from the first error or while the recovery processes is being performed). The processing module may determine whether the error 130B is also recoverable. If the error 130B is also recoverable, the processing module may determine whether the memory locations 155G and the memory locations 155R are both within the range of memory locations 110. Because memory location 155M are not within the range of memory locations 110, the processing module may halt with the error recovery process. For example, the processing module may discontinue or stop storing the memory address and/or data of the memory location 155G and may communicate with the firmware and/or OS so that the firmware and/or OS may also discontinue or stop their respective error recovery operations or processes. In one embodiment, the processing module may transmit a message and/or s signal to the firmware and/or OS indicating that a fatal error (e.g., a data error that causes a computing device to halt operations and/or crash) has occurred. The firmware and/or the OS may halt the operation of the computing device (e.g., may halt operations and/or execution of instructions) and may present one or error messages indicating that the fatal error has occurred (e.g., may display a blue screen of death (BSOD) error). The processing module may also communicate with the VMM so that the VMM may also discontinue recovery operations or processes. For example, the VMM may terminate the operation of the computing device (e.g., may crash or restart the computing device) when the fatal error occurs.

Figure 2:
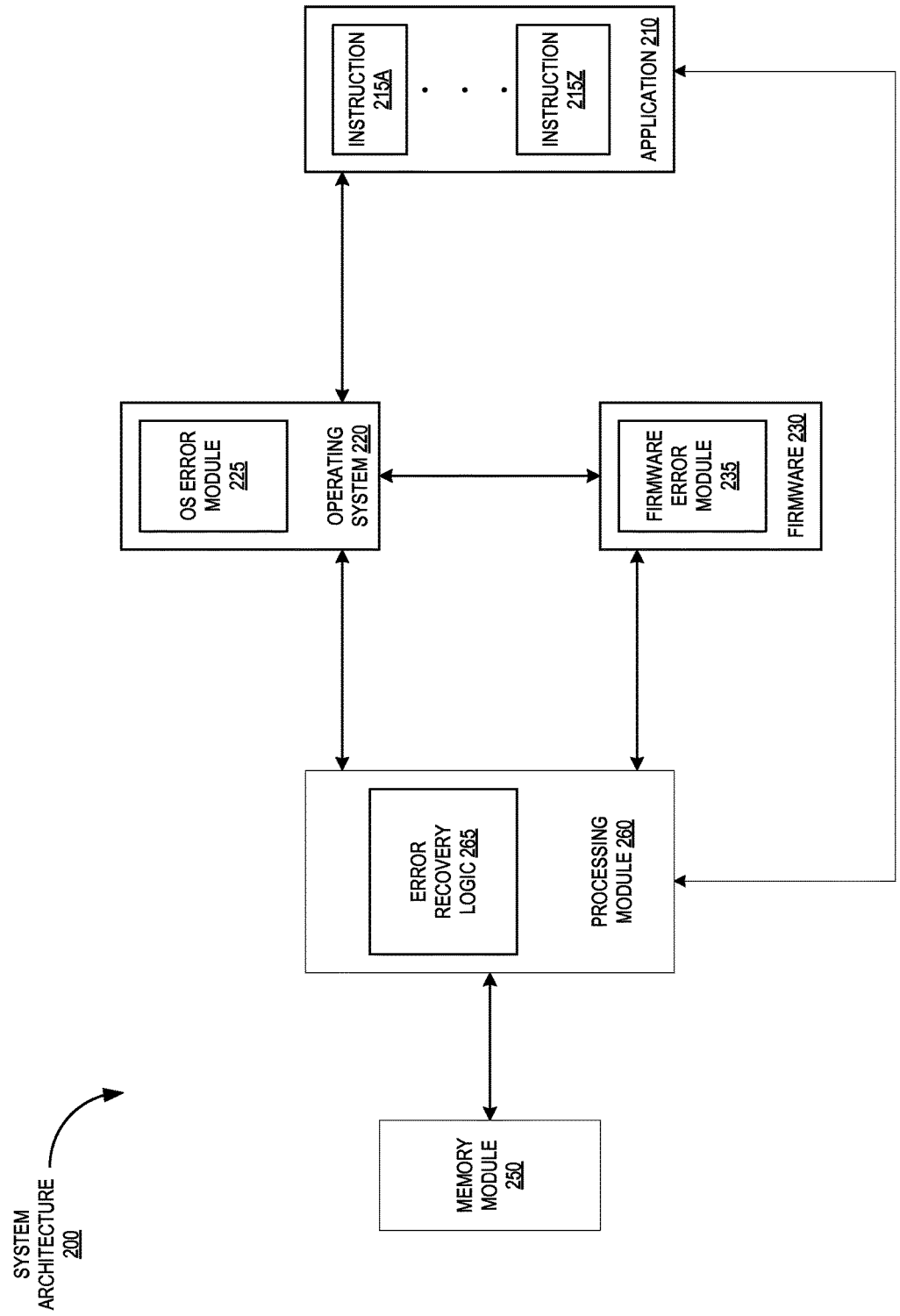
FIG. 2 is a block diagram of a system architecture, according to an embodiment of the disclosure.

FIG. 2 is a block diagram of a system architecture, according to an embodiment of the disclosure. The system architecture 100 includes a processing module 260, a memory module 250, an operating system (OS) 220, a firmware, 230, and an application 210. The processing module 260, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra-low voltage processor, an embedded processor, a processor implementing a combination of instruction sets, and/or any other processor device, such as a digital signal processor, for example. The processing module 260 may also be capable of multi-threading (e.g., may be capable of executing multiple threads and/or applications simultaneously). The processing module 260 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 260 may be from another company, such as ARM Holdings, Ltd, MIPS, etc. The processing module 260 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 260 may be implemented on one or more chips. The processing module 260 may be a part of and/or may be implemented on one or more substrates using any of a number of process technologies, such as, for example, BiCMOS, CMOS, or NMOS. The processing module 260 includes error recovery logic 265.

Processing module 260 may execute instructions 215A through 215Z of application 210. The application 210 may be a program, a software module, a software component, and/or other software module that may be executed by the processing module 260. The application 210 includes a plurality of instructions 215A through 215Z. The instructions 215A through 215Z may include program code to cause processing module 260 to perform activities such as, but not limited to, reading data, writing data, processing data, formulating data, converting data, transforming data, etc. For example, the application 210 may be a binary file and/or an executable file that includes instructions to cause the processing module to execute a media player to play media items (such as digital videos, digital music) or to cause the processing module to execute a web browser. The instructions 215A through 215Z of the application 210 may include a variety of different instructions (e.g., program instructions). For example, the instructions 215A through 215Z may include an ADD instruction (to add two or more values), a MULT instruction (to multiple two or more values), an exclusive-OR (XOR) instruction (to exclusive-or two or more values), an AND instruction (to perform a bit-wise and on two or more values), a store instruction (to store a value in a memory location, such as a register), a JUMP instruction (to direct the flow of execution of the instructions to a particular instruction), a BRANCH instruction (to direct the flow of execution of the instructions to a particular instruction based on one or more conditions, etc.).

The memory module 250 may be one or more components, gates, processing logic, circuits, and/or other hardware that may store data. For example, the memory module may include one or more of a cache, a register, random access memory (e.g., cache, registers, DRAM, SRAM, SDRAM, a TLB, etc.). The memory module 250 may include plurality of memory locations (as illustrated in FIG. 1). A memory location may be an accessible unit of the memory module (e.g., may be a page in memory, may be a line in memory or cache, may be multiple pages or lines in memory), etc. The size of the memory locations may vary in different embodiments. For example, the size of the memory locations may be one kilobyte, four kilobytes, etc. In one embodiment, the memory locations may include instructions of an application that are executed by the processing module 260. For example, a memory location may store an ADD instruction from the application 210. In another embodiment, the memory locations may include data that is used by the instructions 215A through 215Z of the application 210. For example, an ADD instruction may add a first number with a second number to generate a third number. One or more of the first number, the second number, and the third number may be stored in different memory locations.

In one embodiment, the firmware 230 may be processing logic (e.g., software, hardware, and/or a combination of both), that may initialize and test components of a computing device (e.g., the processing module 260, the memory module 250, etc.). The firmware may also load the OS 220 so that the computing device may boot (e.g., may begin execution or begin operating). Examples of the firmware 230 include, but are not limited to, a BIOS and a UEFI. The firmware 230 also includes a firmware error module 235. The firmware error module 235 may operate in conjunction with the error recovery logic 265 and the OS error module 225 to recover from errors in memory locations. In another embodiment, the OS 220 may be processing logic (e.g., software, hardware, and/or a combination of both) that may manage hardware resources of the computing device (e.g., memory module 250, processing module 260, a video card, a sound card, a disk drive, etc.) and may provide common services for different applications (e.g., application 210) on the computing device. The OS 220 includes an OS error module 225. The OS error module 225 may operate in conjunction with the error recovery logic 265 and the firmware error module 235 to recover from errors in memory locations.

In one embodiment, the error recovery logic 265 may be a processing logic that may comprise hardware (e.g., circuitry, dedicated logic, programmable logic, microcode, etc.), software (such as instructions run on a processing device), firmware, or a combination thereof, within the processing module 260. Although the error recovery logic 265 is illustrated as part of the processing module 260, in other embodiments, the error recovery logic 265 may be processing logic that may comprise hardware (e.g., circuitry, dedicated logic, programmable logic, microcode, etc.), software (such as instructions run on a processing device), firmware, or a combination thereof, that is separate from the processing module 260 (e.g., may be a separate circuit or module).

In one embodiment, the error recovery logic 265 may detect errors that occur when accessing memory locations in the memory module 250. The error recovery logic 265 may detect errors when the error recovery logic 265 receives a message, data, and/or a signal from the memory module 250 indicating that there is a data error in a memory location accessed by the processing module 260 (e.g., indicating a data error). For example, when the processing module 260 accesses or requests data (e.g., read and/or writes) in a memory location, the memory module 250 may provide the processing module 260 with the requested data and may provide a flag or indication (e.g., one or more bits, a signal, a message) indicating that there is a data error in the memory location. Providing a message, data, and/or signal indicating a data error in the memory location along with data from the memory location may be referred to as "poisoning" the data. The message, data, and/or signal may indicate that the data from a memory location is poisoned (e.g., that the memory location has a data error and that the data should not be used). As discussed above, these errors may be caused by environmental factors (e.g., alpha particles or cosmic ray hits) and/or improper installation of the memory module 250 in a computing device. In one embodiment, the memory module 250 may transmit a message, data, and/or signal to the processing module 260 for each access to a memory location that contains a data error.

In one embodiment, the error recovery logic 265 may determine whether a data error is correctable or uncorrectable. The error recovery logic 265 may also determine whether the data error is recoverable or unrecoverable. In one embodiment, a correctable error may be an error that can be rectified or corrected by hardware without losing data. For example, errors in data may be corrected (and the original data may be recovered using an error correction code. In another embodiment, an uncorrectable error may be an error that cannot be rectified or corrected by hardware to its original form without losing data (e.g., an error in the data and in the error correction code of the data). In one embodiment, a recoverable error may be an uncorrectable error (e.g., an error that cannot be corrected or rectified without losing data) but may be rectified or corrected with additional operations (e.g., re-fetching the data from data store, terminating an application, un-mapping memory locations, etc.). In another embodiment, an unrecoverable error may be an error that cannot be rectified or corrected by hardware and by performing additional operations. Unrecoverable errors may often cause a computing device to halt execution or halt operations (e.g., may cause a computing device to crash).

In one embodiment, the error recovery logic 265 may initiate a recovery process for errors that are recoverable and uncorrectable. For example, error recovery logic may store the address of the memory location where the data error occurred, may store an instruction address for the instruction that accessed the memory location and/or may store the data in the memory location. The error recovery logic 265 may also communicate with the firmware error module 235 and the OS error module 225 so that the computing device may recover from a data error in one or more memory locations. For example, if the error recovery logic 265 determines that a data error is uncorrectable but is recoverable, the error recovery logic 265 may work in conjunction with the firmware error module 235 and the OS error module 225 to determine whether the memory location is used by an application. If the memory location is not used by an application, the error recovery logic 265 may work in conjunction with the firmware error module 235 and the OS error module 225 to un-map the memory location (e.g., to remove the memory location from a table and/or a list that maps the physical address of the memory location to a logical address used by the OS 220 and application 210) and to mark (or otherwise indicate) the memory location as unusable. If the memory location is used by an application (e.g., application 210), the error recovery logic 265 may also work in conjunction with the firmware error module 235 and the OS error module 225 to halt execution of the application (e.g., to terminate the application that accessed the memory location) and to un-map the memory location.

In one embodiment, the error recovery logic 265 may detect multiple errors at one or memory locations. For example, two instructions may access the same memory location that has a data error and the error recovery logic 265 may detect errors resulting from both the instructions. In another example, two instructions may access different memory locations that each have a data error and the error recovery logic 265 may detect errors resulting from both the instructions. When the error recovery logic 265 detects a second error (e.g., a second recoverable and uncorrectable error) in a second memory location during a recovery process of a first error in a first memory location (e.g., the second error occurs while the error recovery logic 265, the OS error module 225, the firmware error module 235 and/or a VMM are still recovering from the first error), the error recovery logic 265 may determine whether first memory location and the second memory location are within a range of memory locations. For example, referring to FIG. 1, the error recovery logic 265 may determine whether the first and second memory locations are within the range of memory locations 210 starting at memory location 155E through memory location memory location 155O. The error recovery logic 265 may identify the range of memory locations 210 based on a starting memory location (e.g., memory location 155E) and a range indicator. The range indicator may be any data (e.g., bits, values, etc.) that indicate a plurality of memory locations. For example, the range indicator may be a bit string representing a numerical value, such as one hundred. The error recovery logic 265 may identify one hundred memory locations beginning from the starting memory location as the range of memory locations. In another embodiment, the range indicator may be data that may be used to determine whether a memory location is within a range of memory locations. For example, as discussed below in conjunction with FIG. 4, the range indicator may be a bit mask/value that may be used to calculate and/or determine whether a memory location is within the range of memory locations 210.

In one embodiment, the error recovery logic 265 may receive one or more of the starting memory location (e.g., a memory address of a starting memory location or a base memory location) and the range indicator from a component and/or module that is external to the processing module 260. For example, the starting memory location and the range indicator may be received from the firmware 230 and/or the OS 220. In one embodiment, one or more of the starting memory location and the range indicator may be configurable by a user of the computing device (e.g., the user may configure the starting memory location or range indicator by interacting with the firmware 230 or the OS 220). It should be understood that different starting locations and/or different range indicators may be used based one or more of the components of a computing device (e.g., based on a size of a memory module and/or sizes of memory locations) and/or user preferences. In another embodiment, the error recovery logic 265 may update one or more of the starting memory location and the range indicator. For example, after providing a first starting location and a first range indicator, the firmware 230 and/or OS 220 may provide a second starting location and a second range indicator to the error recovery logic 265. The error recovery logic 265 may use the second starting location and the second range indicator when detecting and analyzing future errors and determining whether the future errors are in a second range based on the second starting location and the second range indicator. In one embodiment, the starting memory location may be stored in a first register (e.g., a unit of storage) within the processing module 260 and the range indicator may be stored in a second register within the processing module 260. In one embodiment, the first register and the second register may be model specific registers (MSRs). An MSR may be for a register that stores data used for debugging, program execution tracing, performance monitoring, and toggling certain features of the processing module.

In one embodiment, the error recovery logic 265 may continue the recovery process if multiple data errors occur in one or more memory locations within a range of memory locations. Referring to FIG. 1, the error recovery logic 265 may continue the recovery process if multiple data errors occur one or more memory locations in the range of memory locations 110 (e.g., occur within memory locations 155E through 155O). For example, the error recovery logic 265 may continue to store or record the memory location of a first error and an instruction address of an instruction that resulted in the first error. In a further embodiment, the error recovery logic 265 may continue the recovery process if multiple data errors occur in one or more memory locations within multiple ranges, sets, or blocks of memory locations. For example, errors may occur in two or more different ranges or blocks of memory locations that are not consecutive or continuous. The error recovery logic may continue the recovery process if the multiple errors occur in these non-consecutive and/or non-continuous regions.

In another embodiment, the error recovery logic 265 may halt the recovery process of one of the multiple data errors is outside of the range of memory locations. Referring to FIG. 1, the error recovery logic 265 may halt the recovery process if one or more errors occur in one or more memory locations outside the range of memory locations 110 (e.g., error 130B occurs in memory location 155R). For example, the error recovery logic may not continue to store or record the memory location of a first error and an instruction address of an instruction that resulted in the first error. In one embodiment, the error recovery logic 265 may also communicate with the OS error module 225 and the firmware error module 235 to indicate that the recovery process was halted or stopped. The OS 220 and/or firmware 230 may halt execution of the computing device (e.g., may crash and/or may cause the computing device to crash) and may display a message indicating that one or more errors occurred when accessing one of more memory locations (e.g., may display a BSOD error).

Figure 4:
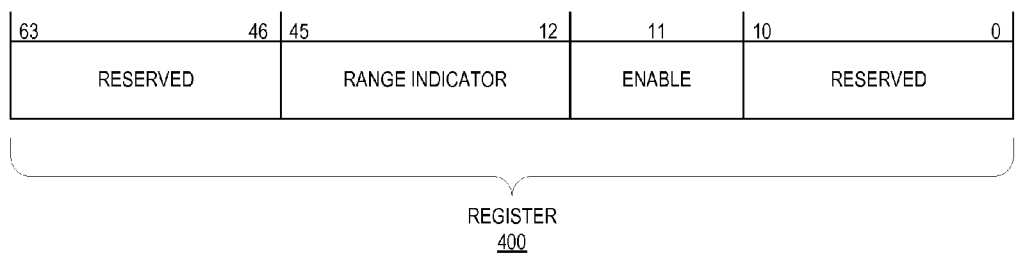
FIG. 4 is a block diagram illustrating a register, according to another embodiment of the disclosure.

In one embodiment, the error recovery logic 265 may determine whether to analyze and/or process multiple data errors in one or more memory locations based on a flag or value. For example, the error recovery logic 265 may determine whether processing and/or analyzing of multiple data errors are enabled by checking the flag or value. This flag or value may be stored along with the range indicator (e.g., may be a bit in a register that stores the range indicator) as illustrated in FIG. 4 or may be stored separate from the range indicator and the starting memory location. In one embodiment, if the flag or value indicates that multiple data errors should not be processed and/or analyzed, the error recovery logic may halt a recovery process for a first error when a second error occurs. In another embodiment, if the flag or value indicates that multiple data errors should be processed and/or analyzed, the error recovery logic 265 may determine whether a first and second error are in memory locations that are within the range of memory locations. If the first and second errors are in memory locations that are within the range of memory locations, the error recovery logic 265 may continue the recovery process for the first error. If the first and second errors are not in memory locations that are not within the range of memory locations, the error recovery logic 265 may halt the error recovery process. In one embodiment, the OS 220 and/or the firmware 230 may set the flag or value to enable or disable processing and/or analyzing of multiple errors in one or more memory locations.

Figure 3:
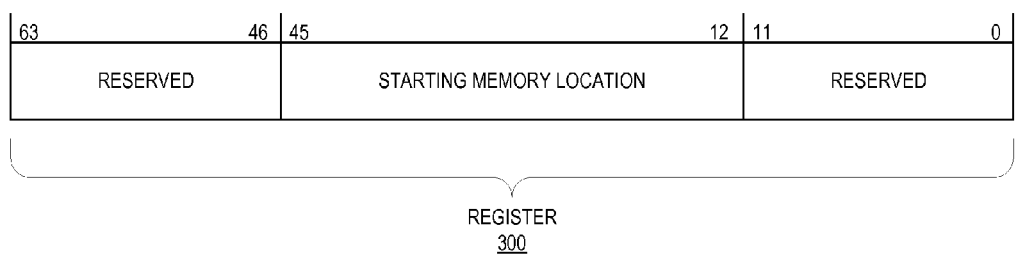
FIG. 3 is a block diagram illustrating a register, according to one embodiment of the disclosure.

FIG. 3 is a block diagram illustrating a register 300, according to one embodiment of the disclosure. In one embodiment, the register 300 may be an MSR. The register 300 may store a starting memory location (e.g., a base memory location) for a range of memory locations in a memory module. For example, referring to FIG. 1, the register 300 may store data indicating the memory location 155E from the range of memory locations 110. As illustrated in FIG. 1, the register has a size of sixty-four bits. Bits 0 through 11 and 46-63 may be reserved bits (e.g., may be bits that are reserved for a different purpose and/or may not be currently used). Bits 12 through 45 may store a bit value representing the starting memory location. For example, the bits 12 through 45 may store a memory address for the starting memory location. It should be understood that the starting memory location may be represented in various ways (e.g., a memory address, a relative memory address, etc.). Although the starting location is stored using 34 bits (e.g., bits 12-45), different embodiments may use a different number of bits to represent the starting memory location. As discussed above, the processing module may also use multiple ranges of memory locations. Multiple registers (e.g., multiple MSRs) may be used to store a starting memory location for each of the multiple ranges of memory locations or the multiple starting memory locations may be stored in one MSR. The multiple registers may have the same format as register 300.

FIG. 4 is a block diagram illustrating a register 400, according to another embodiment of the disclosure. In one embodiment, the register 400 may be an MSR. The register 400 may store a range indicator and an enable value for a range of memory locations in a memory module. For example, referring to FIG. 1, the register 400 may store data indicating the size of the range of memory locations 110. As illustrated in FIG. 1, the register has a size of sixty-four bits. Bits 0 through 10 and 46 through 63 may be reserved bits (e.g., may be bits that are reserved for a different purpose and/or may not be currently used). Bits 12 through 45 may store the range indicator (e.g., a bit value representing the range of memory locations). For example, the bits 12 through 45 may store a bit value representing numerical value (e.g., 256) where the numerical value indicates the number of memory locations beginning from a starting memory location that should be included in a range of memory locations. In another embodiment, the bits 12 through 45 may be used to determine whether a memory location is within a range of memory locations. For example, when determining whether memory location is within a range of memory locations, the memory address of the memory location may be ANDed (e.g., a logical AND operation) with the range indicator and the result may be compared with the starting memory location. If the result is greater than the starting memory location, the memory location may not be within the range of memory locations. If the result is not greater than the starting memory location, the memory location may be within the range of memory locations. Although the range indicator is stored using 34 bits (e.g., bits 12-45), different embodiments may use a different number of bits to represent the range indicator. As discussed above, the processing module may also use multiple ranges of memory locations. Multiple registers (e.g., multiple MSRs) may be used to store a range indicator for each of the multiple ranges of memory locations or the multiple range indicators may be stored in one MSR. The multiple registers may have the same format as register 400.

Figure 5:
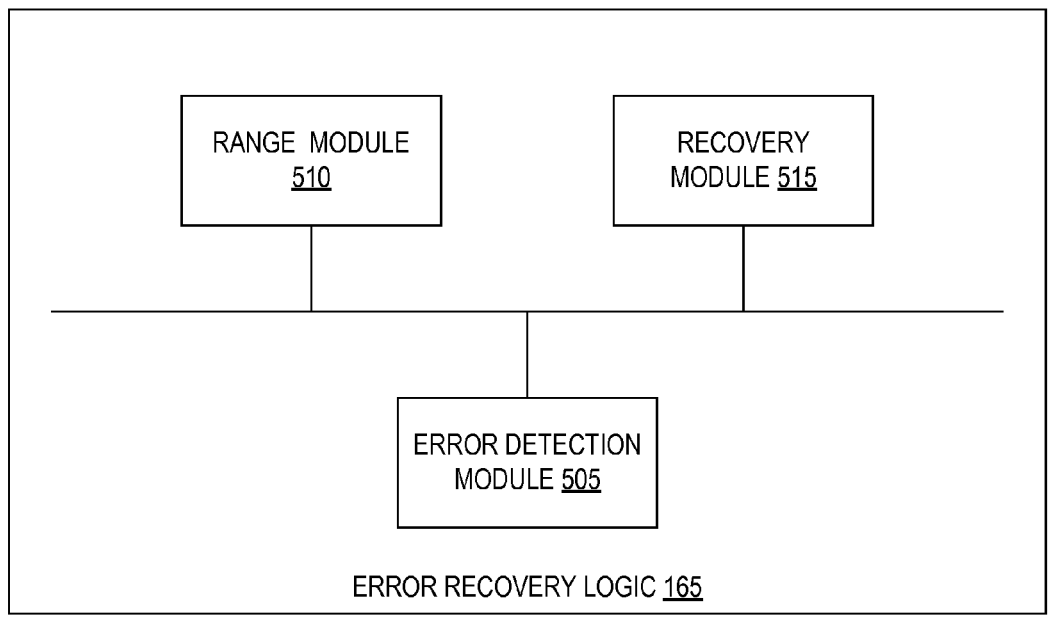
FIG. 5 is a block diagram illustrating an error recovery module, according to one embodiment of the disclosure.

FIG. 5 is a block diagram illustrating an error recovery module 165, according to one embodiment of the disclosure. In one embodiment, the error recovery module 165 may be included as a component in a processing module. For example, the error recovery module 165 may be a processing logic that may comprise hardware (e.g., circuitry, dedicated logic, programmable logic, microcode, etc.), software (such as instructions run on a processing device), firmware, or a combination thereof, within the processing module. In another embodiment, the error recovery module 165 may comprise hardware (e.g., circuitry, dedicated logic, programmable logic, microcode, etc.), software (such as instructions run on a processing device), firmware, or a combination thereof, that is separate from the processing module (e.g., may be a separate circuit). The error recovery module 165 includes an error detection module 505, a range module 510, and a recovery module 515.

In one embodiment, the error detection module 505 may receive an indication, message, signal, value and/or other data to indicate that a data error has occurred in a memory location. For example, the error detection module 505 may receive data for a memory location and may receive an indication that the data is poisoned (e.g., that the data is from a memory location that has a data error and the data should not be used). The error detection module 505 may receive the indication that the data is poisoned from a memory module.

In one embodiment, the range module 510 may determine whether a memory location that has a data error is within a range of memory locations. The range module 510 may use a starting location and a range indicator that may be stored in registers, such as MSRs, (as discussed above in conjunction with FIGS. 3-4). In one embodiment, the range module 510 may receive one or more of the starting location and the range indicator from firmware (e.g., a BIOS) and/or an OS. In another embodiment, the range module 510 may receive one or more of an updated starting location (e.g., a second starting location) and an updated range indicator (e.g., a second indicator) from the firmware and/or the OS. The range module 510 may identify a new range of memory locations using the updated starting range and/or the updated range indicator.

In one embodiment, the recovery module 515 may initiate a recovery process for a data error. For example, the recovery module 515 may store, record, and/or log a memory address for the memory location that contains the data error. The recovery module 515 may also store the instruction address of the instruction that accessed the memory location and may also store the data in the memory location. The recovery module 515 may also communicate with an OS error module and/or a firmware error module so that the firmware and/or OS may also recover from the error (e.g., unmap a memory location, halt execution of an application or thread, etc.), as discussed above in conjunction with FIGS. 1-4.

In one embodiment, the recovery module 515 may determine whether analyzing and/or processing of multiple data errors are enabled. For example, the recovery module 515 may determine whether processing and/or analyzing of multiple data errors are enabled by checking the flag or value. As discussed above in conjunction with FIGS. 1-4, the flag or value may be set by one or more of a user, a firmware, and/or and OS. If the flag or value indicates that multiple data errors should not be processed and/or analyzed, the error recovery logic may halt a recovery process for a first error when a second error occurs. If the flag or value indicates that multiple data errors should be processed and/or analyzed, the recovery module 515 may determine whether a first and second error are in memory locations that are within the range of memory locations. If the first and second errors are in memory locations that are within the range of memory locations, the recovery module 515 may continue the recovery process for the first error. If the first and second errors are not in memory locations that are within the range of memory locations, the recovery module 515 may halt the error recovery process.

Figure 6:
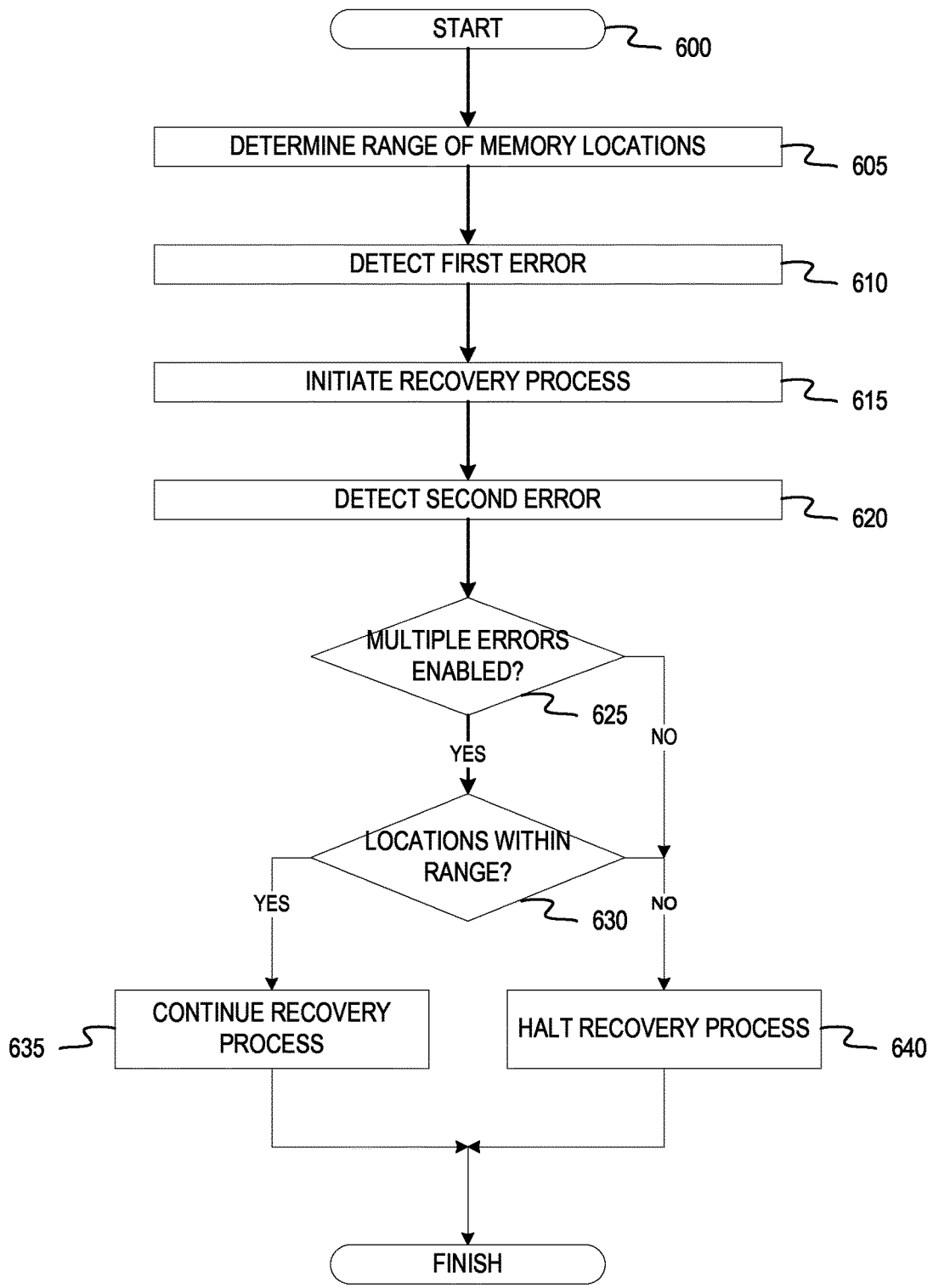
FIG. 6 is a flow diagram illustrating a method of recovering from one or more errors, according to one embodiment of the disclosure.

FIG. 6 is a flow diagram illustrating a method 600 of recovering from one or more errors, according to one embodiment of the disclosure. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 may be performed an error recovery module, as illustrated in FIGS. 2 and 5. For simplicity of explanation, the method 600 is depicted and described as a series of acts. However, acts in accordance with this disclosure can occur in various orders and/or concurrently and with other acts not presented and described herein. Furthermore, not all illustrated acts may be required to implement the method 600 in accordance with the disclosed subject matter. In addition, those skilled in the art will understand and appreciate that the method 600 could alternatively be represented as a series of interrelated states via a state diagram or events.

Referring to FIG. 6 the method 600 begins at block 605 where the processing logic determines a range of memory locations. The processing logic may use a starting memory location and a range indicator to determine the range of memory locations (as discussed above in conjunction with FIGS. 1-5). At block 610, the processing logic detects a first error (e.g., a first data error) in a first memory location. For example, the processing logic may receive poisoned data (e.g., receive data from a memory location and a flag, indicator, or value indicating that the memory location has a data error and that the data should not be used). The processing logic initiates an error recovery process at block 615. For example, the processing logic may store the memory location, an instruction address, and/or the data from the memory location. The processing logic detects a second error (e.g., a second data error) in a second memory location at block 620. The processing logic determines whether processing and/or analyzing of multiple errors are enabled (block 625). For example, the processing logic may analyze an enable value or flag (as discussed above in conjunction with FIGS. 2-5) to determine whether multiple data errors should be processed and/or analyzed. If processing and/or analyzing of multiple errors are not enabled, the processing logic proceeds to block 640 where the processing logic halts the recovery process. If processing and/or analyzing of multiple errors are enabled, the processing logic proceeds to block 630 where the processing logic determines whether the first memory location and the second memory location are within the range of memory locations. If the first memory location and the second memory location are within the range of memory locations, the processing logic proceeds to block 635 where the processing logic continues the recovery process. After block 635, the method 600 ends. If the first memory location and the second memory location are not within the range of memory locations, the processing logic proceeds to block 640 where the processing logic halts the recovery process. After block 640, the method 600 ends.

Although two errors are illustrated in FIG. 6, it should be understood that in other embodiments, multiple errors (e.g., 3, 10, 20 errors) may occur the processing logic is recovering from a first error (e.g., during the operations of the recovery process). The processing logic may determine whether the multiple errors are within a range of memory locations (or within one of multiple ranges of memory locations) and may continue the recovery process if the multiple errors are within the range of memory locations (or within one or the multiple ranges of memory locations). The processing logic may also halt the recovery process if one of the multiple errors is not within the range of memory locations (or is not within one or the multiple ranges of memory locations).

In addition, the processing logic may also determine whether the second error (or other multiple errors) is within one range of memory locations from multiple ranges of memory locations. For example, the processing logic may determine whether a second error (or multiple other errors) is within a first range of memory locations or a second range of memory locations.

Figure 7:
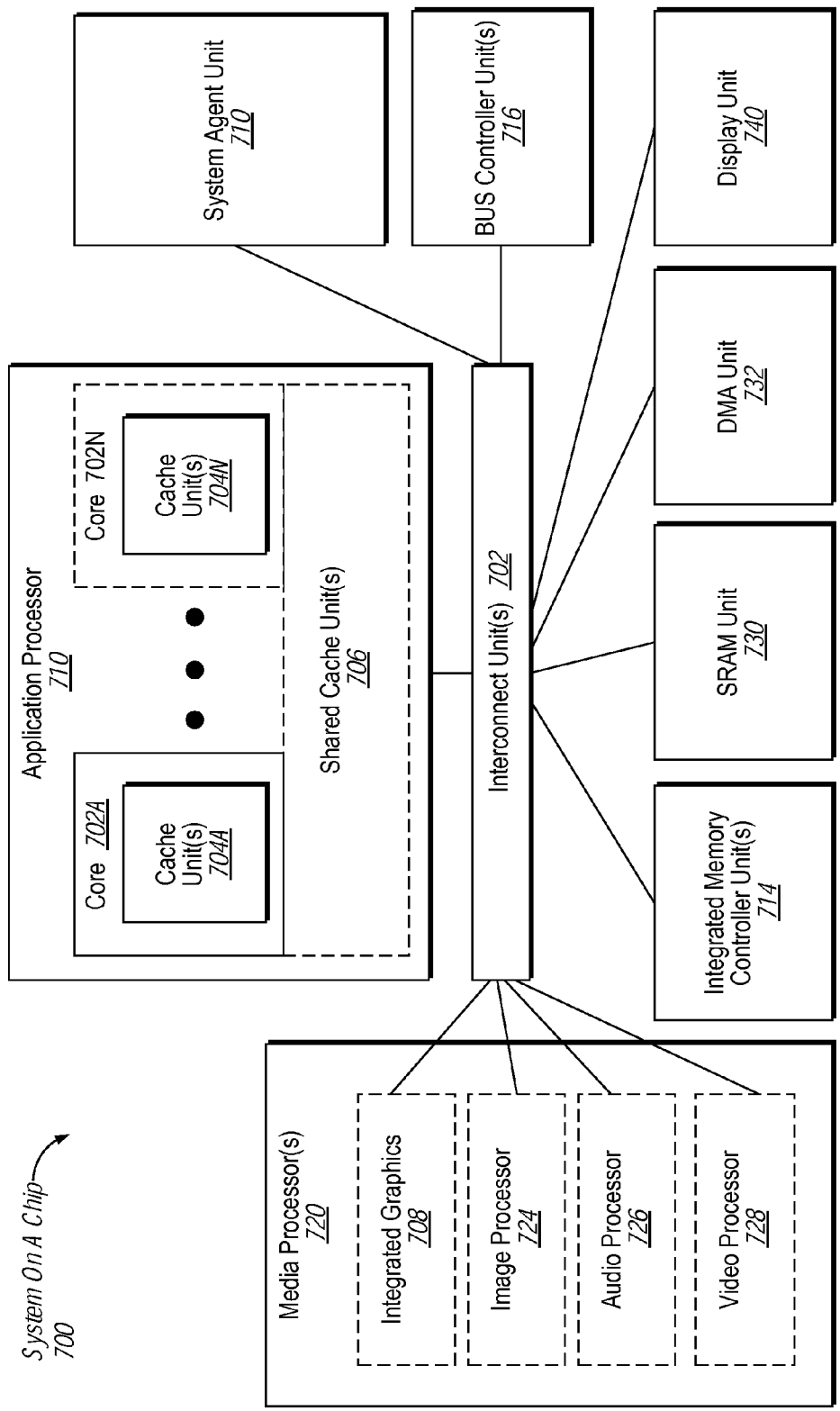
FIG. 7 is a block diagram of a system on chip (SoC), in accordance with an embodiment of the present disclosure.

FIG. 7 is a block diagram of a SoC 700 in accordance with an embodiment of the present disclosure. Dashed lined boxes are optional features on more advanced SoCs. In FIG. 7, an interconnect unit(s) 712 is coupled to: an application processor 720 which includes a set of one or more cores 702A-N and shared cache unit(s) 706; a system agent unit 710; a bus controller unit(s) 716; an integrated memory controller unit(s) 714; a set of one or more media processors 718 which may include integrated graphics logic 708, an image processor 724 for providing still and/or video camera functionality, an audio processor 726 for providing hardware audio acceleration, and a video processor 728 for providing video encode/decode acceleration; an static random access memory (SRAM) unit 730; a direct memory access (DMA) unit 732; and a display unit 740 for coupling to one or more external displays. In one embodiment, error recovery logic (as discussed in conjunction with FIGS. 1-6) may be included in the one or more of the cores 702A through 702N. In another embodiment, the error recovery logic may be included in one or more other components of the SoC 700 that may be used to recover from data errors.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof.

In some embodiments, one or more of the cores 702A-N are capable of multi-threading.

The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture and/or instruction set. For example, some of the cores 702A-N may be in order while others are out-of-order. As another example, two or more of the cores 702A-N may be capable of execution of the same instruction set, while others may be capable of executing only a subset of that instruction set or a different instruction set.

The application processor 720 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 720 may be from another company, such as ARM Holdings, Ltd, MIPS, etc. The application processor 720 may be a special-purpose processor, such as, for example, a network or communication processor, compression engine, graphics processor, co-processor, embedded processor, or the like. The application processor 720 may be implemented on one or more chips. The application processor 720 may be a part of and/or may be implemented on one or more substrates using any of a number of process technologies, such as, for example, BiCMOS, CMOS, or NMOS.

Figure 8:
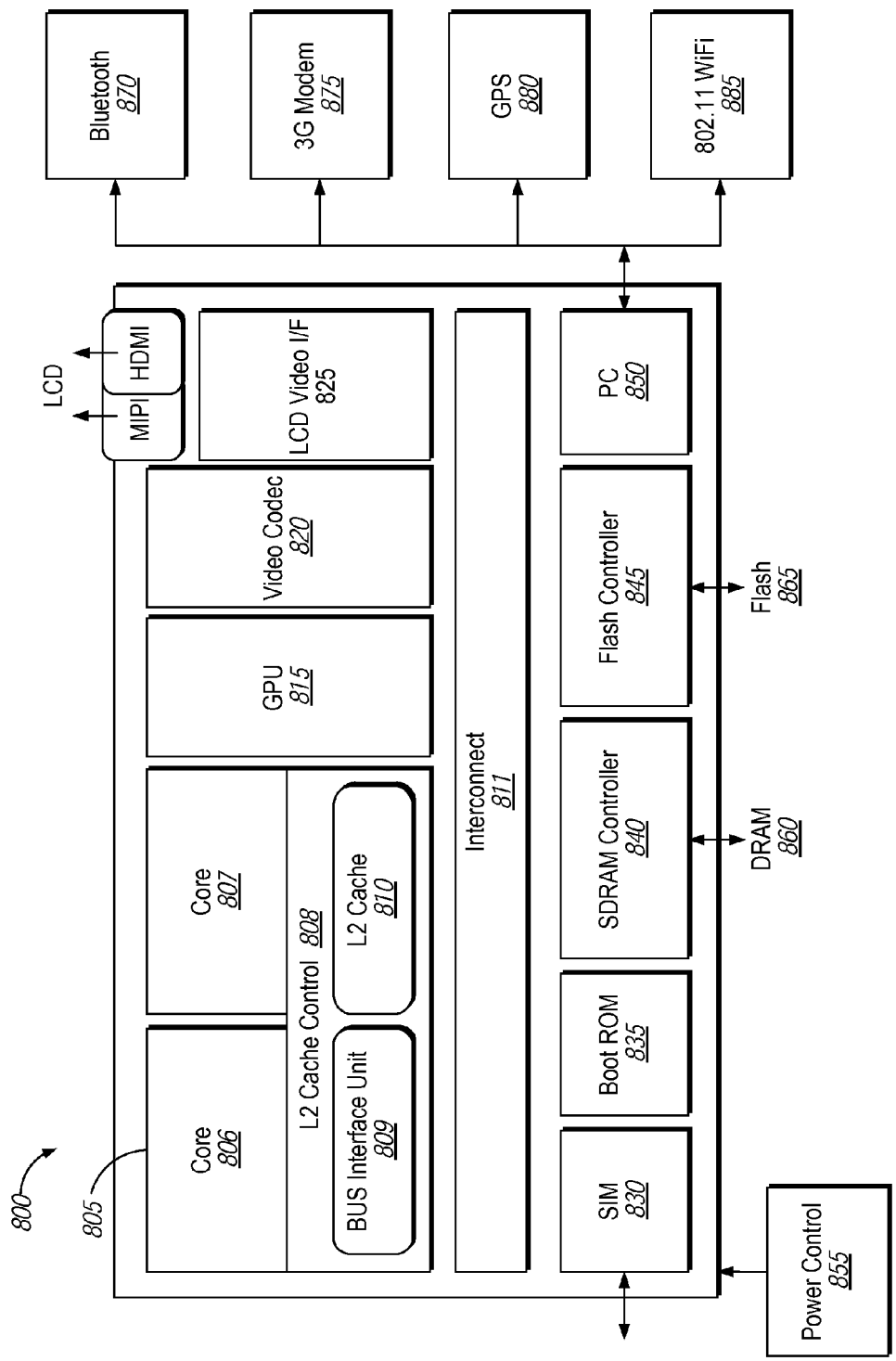
FIG. 8 is a block diagram of an embodiment of a system on-chip (SOC) design, in accordance with another embodiment of the present disclosure.

FIG. 8 is a block diagram of an embodiment of a system on-chip (SOC) design in accordance with the present disclosure. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, error recovery logic (as discussed in conjunction with FIGS. 1-6) may be included in the one or more of the cores 806 and 807. In another embodiment, the error recovery logic may be included in one or more other components of the SOC 800 that may be used to recover from data errors.

Here, SOC 800 includes 2 cores—806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system 800 illustrates peripherals for communication, such as a Bluetooth module 870, 3G modem 875, GPS 880, and Wi-Fi 885. Note as stated above, a UE includes a radio for communication. As a result, these peripheral communication modules are not all required. However, in a UE, some form a radio for external communication is to be included.

Figure 9:
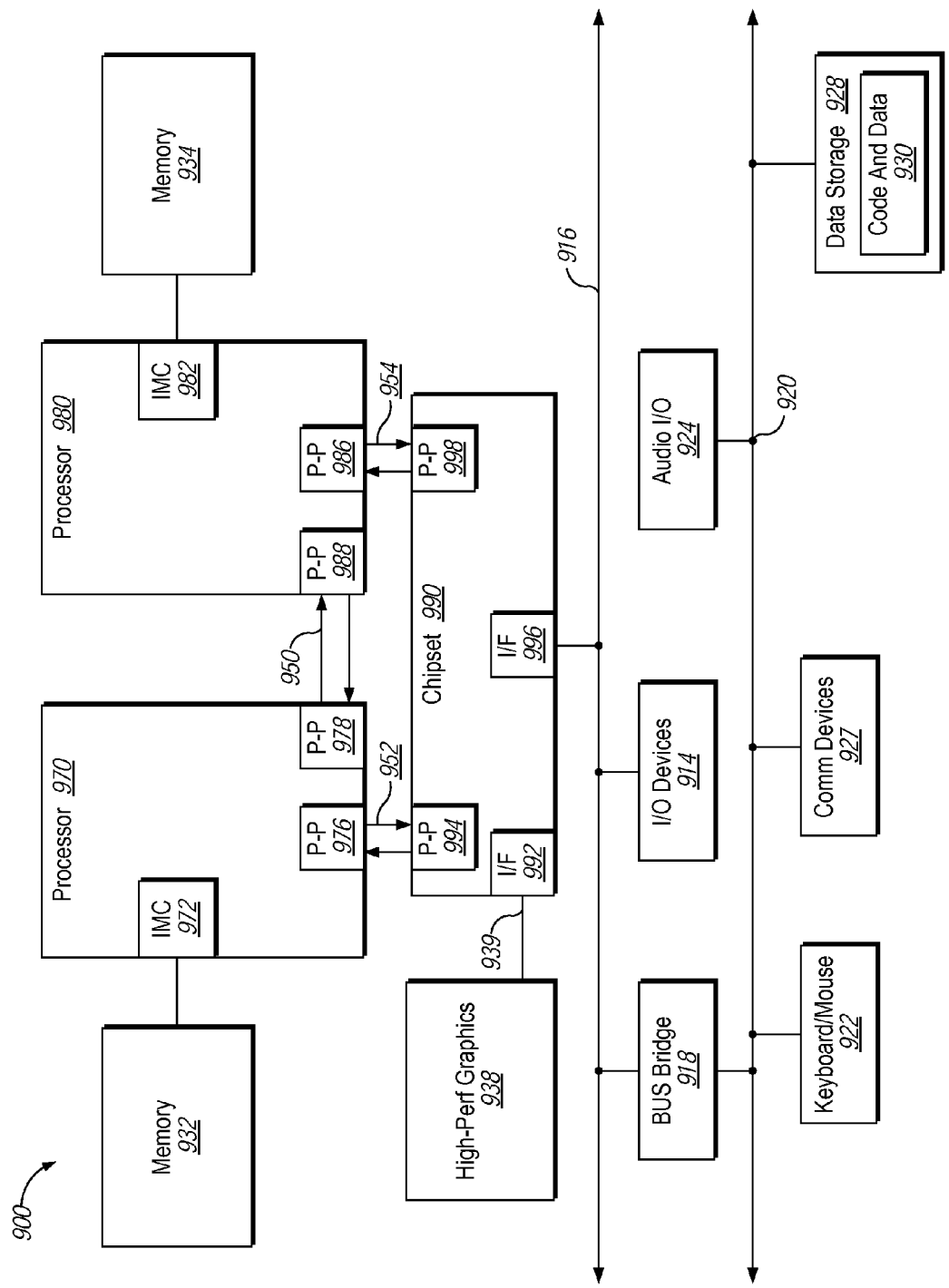
FIG. 9 is a block diagram of a computer system, according to one embodiment of the present disclosure.

FIG. 9 is a block diagram of a multiprocessor system 900 in accordance with an implementation. As shown in FIG. 9, multiprocessor system 900 is a point-to-point interconnect system, and includes a first processor 970 and a second processor 980 coupled via a point-to-point interconnect 950. Each of processors 970 and 980 may be some version of the processing module 160 of FIG. 1. As shown in FIG. 9, each of processors 970 and 980 may be multicore processors, including first and second processor cores (i.e., processor cores 974a and 974b and processor cores 984a and 984b), although potentially many more cores may be present in the processors. A processor core may also be referred to as an execution core. The processors each may include hybrid write mode logics in accordance with an embodiment of the present. In one embodiment, error recovery logic (as discussed in conjunction with FIGS. 1-6) may be included in the one or more of the processors 970 and 980. In another embodiment, the error recovery logic may be included in one or more other components of the multiprocessor system 900 that may be used to recover from data errors.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, and 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10A:
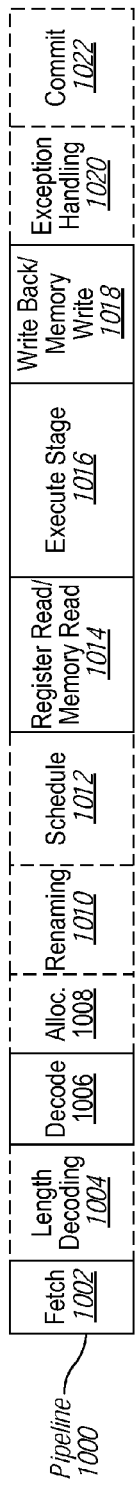
FIG. 10A is a block diagram illustrating an in-order pipeline and a register renaming stage, out-of-order issue/execution pipeline implemented by a processor core, in accordance with one embodiment of the present disclosure.
Figure 10B:
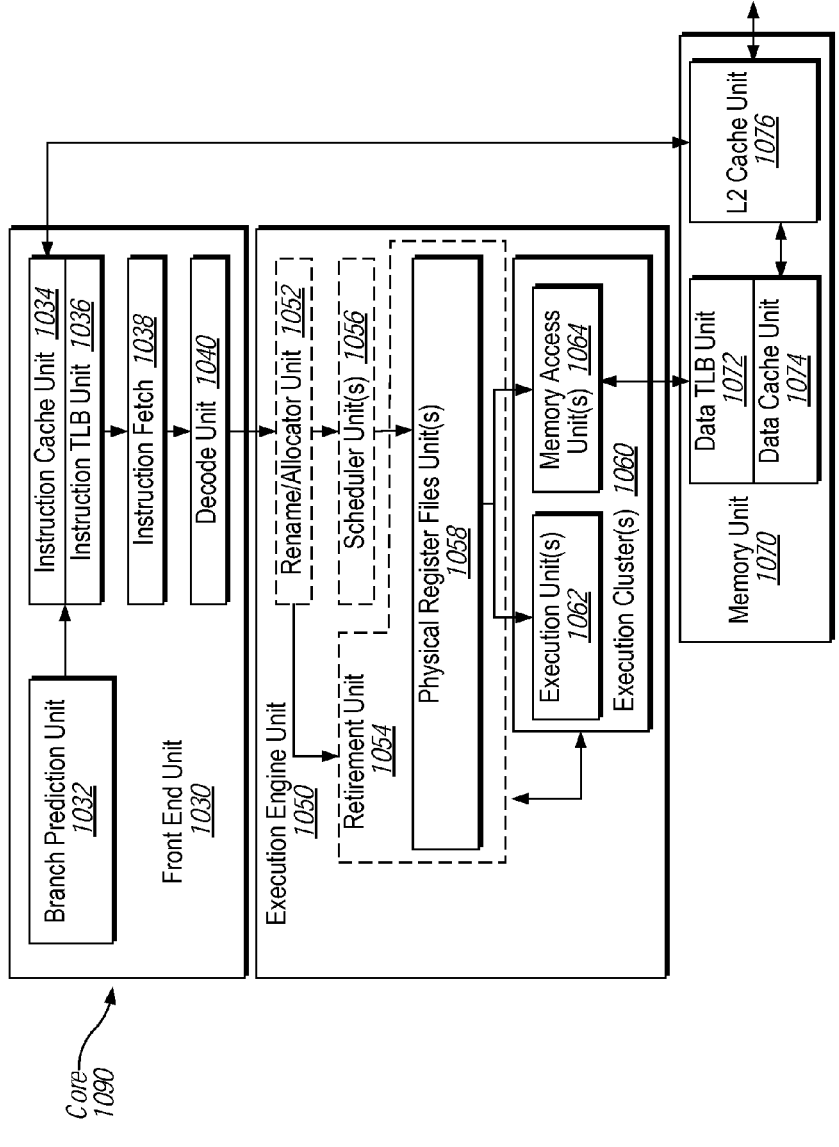
FIG. 10B is a block diagram illustrating an in-order architecture core and a register renaming logic, out-of-order issue/execution logic to be included in a processor according to at least one embodiment of the disclosure.

FIG. 10A is a block diagram illustrating an in-order pipeline and a register renaming stage, out-of-order issue/ execution pipeline implemented by core 1090 of FIG. 10B (which may be include in a processor). FIG. 10B is a block diagram illustrating an in-order architecture core and a register renaming logic, out-of-order issue/execution logic that may be included in a processor according to at least one embodiment of the invention. The solid lined boxes in FIG. 10A illustrate the in-order pipeline, while the dashed lined boxes illustrates the register renaming, out-of-order issue/ execution pipeline. Similarly, the solid lined boxes in FIG. 10A illustrate the in-order architecture logic, while the dashed lined boxes illustrates the register renaming logic and out-of-order issue/execution logic. In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1010, an execute stage 1016, a write back/memory write stage 1018, an exception handling stage 1022, and a commit stage 1024. In one embodiment, error recovery logic (as discussed in conjunction with FIGS. 1-6) may be used by processing core 1090 (illustrated in FIG. 10B) at one or more of the execute stage 1016 and the exception handling stage 1020.

FIG. 10B is a block diagram illustrating an in-order architecture core and a register renaming logic, out-of-order issue/execution logic that may be included in a processor according to at least one embodiment of the disclosure. In FIG. 10B, arrows denote a coupling between two or more units and the direction of the arrow indicates a direction of data flow between those units. FIG. 10B shows processor core 1090 including a front end unit 1030 coupled to an execution engine unit 1050, and both are coupled to a memory unit 1070. In one embodiment, error recovery logic (as discussed in conjunction with FIGS. 1-6) may be included in the execution engine unit 1050. In another embodiment, the error recovery logic may be included in one or more other components of the core 1090 that may be used to recover from data errors.

The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to a level 2 (L2) cache unit 1076 in the memory unit 1070. The decode unit 1040 is coupled to a rename/allocator unit 1052 in the execution engine unit 1050.

The execution engine unit 1050 includes the rename/ allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 162 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1010; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
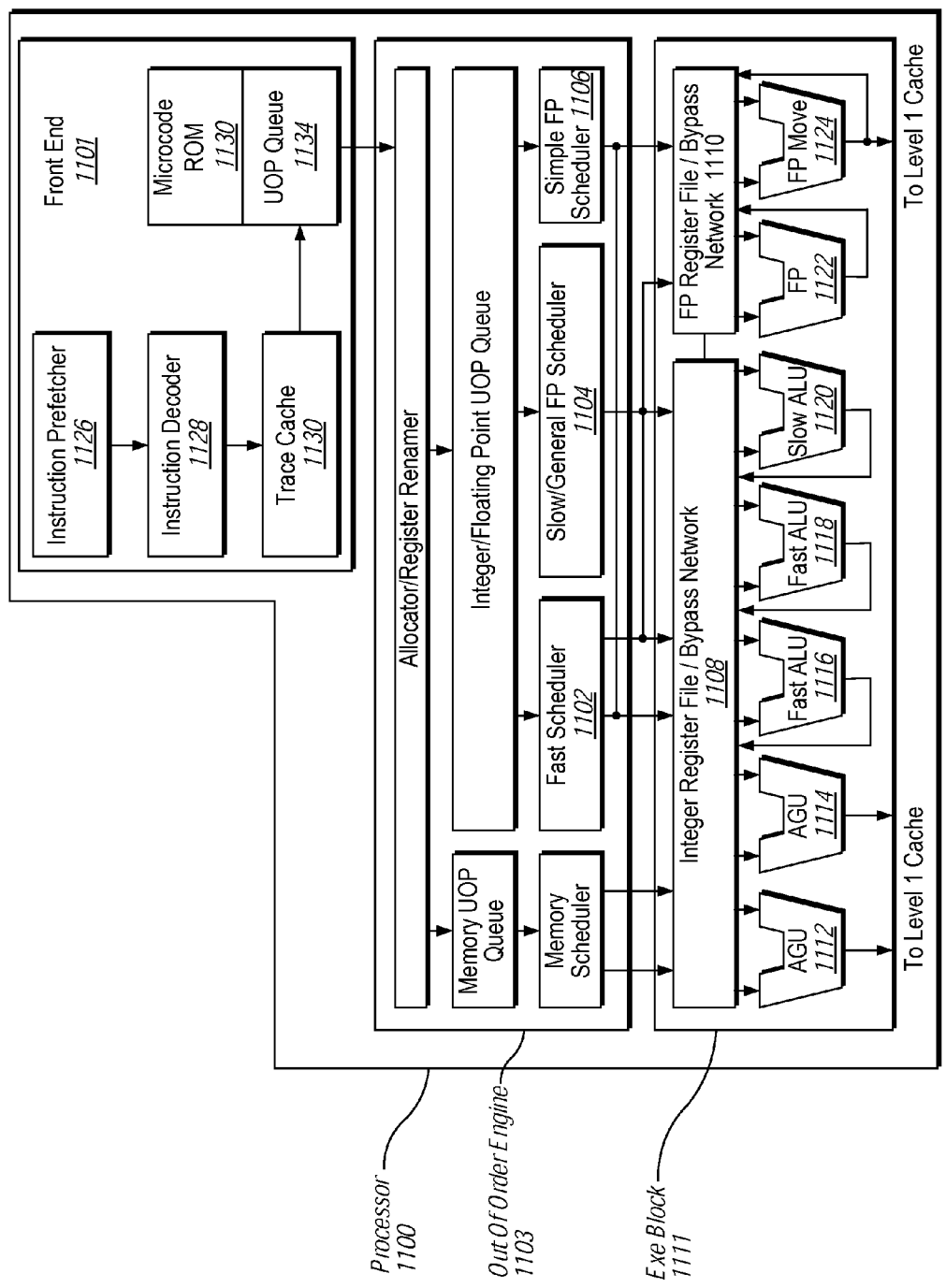
FIG. 11 is a block diagram of the micro-architecture for a processor that includes logic circuits to perform instructions, in accordance with one embodiment of the present invention.

FIG. 11 is a block diagram of the micro-architecture for a processor 1100 that includes logic circuits to perform instructions in accordance with one embodiment of the present invention. In some embodiments, an instruction in accordance with one embodiment can be implemented to operate on data elements having sizes of byte, word, double-word, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The front end 1101 may include several units. In one embodiment, the instruction prefetcher 1126 fetches instructions from memory and feeds them to an instruction decoder 1128 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, the microcode ROM 1132 provides the uops needed to complete the operation. In one embodiment, error recovery logic (as discussed in conjunction with FIGS. 1-6) may be included in the execution block 1111. In another embodiment, the error recovery logic may be included in one or more other components of the processor 1100 that may be used to recover from data errors.

Some instructions are converted into a single micro-op, whereas others need several micro-ops to complete the full operation. In one embodiment, if more than four micro-ops are needed to complete an instruction, the decoder 1128 accesses the microcode ROM 1132 to do the instruction. For one embodiment, an instruction can be decoded into a small number of micro ops for processing at the instruction decoder 1128. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1102, 1104, 1106, and the execution units 1112, 1114, 1116, 1118, 1120, 1122, and 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute.

The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1122, 1124, execute floating point, MMX, SIMD, and SSE, or other operations. The floating point ALU 1122 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 12:
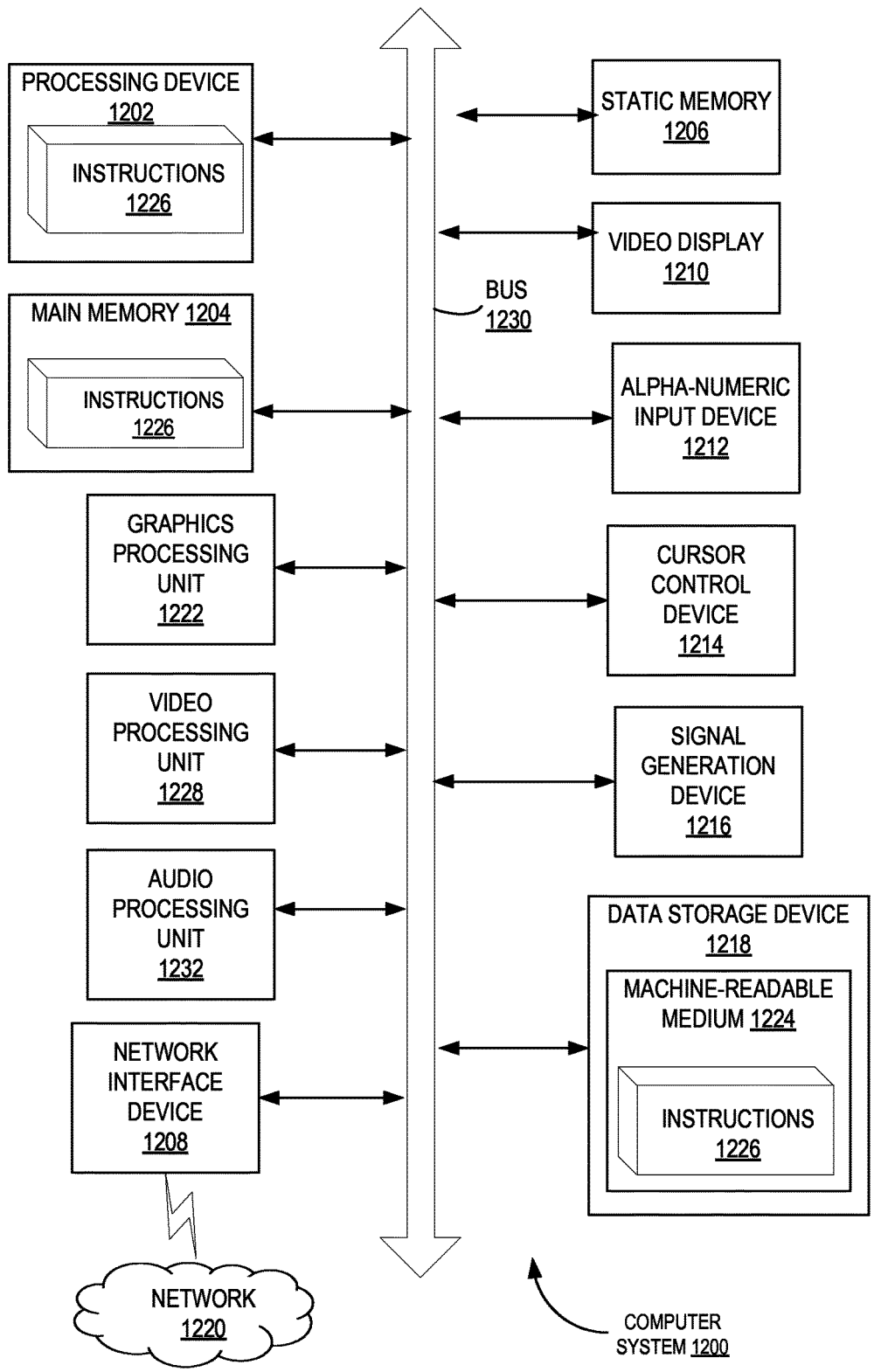
FIG. 12 illustrates a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, error recovery logic (as discussed in conjunction with FIGS. 1-6) may be included in the execution block processing device 1202. In another embodiment, the error recovery logic may be included in one or more other components of the computer system 1200 that may be used to recover from data errors.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the instructions 1226 of an error recovery logic for performing the operations discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computer system 1200 may include a graphics processing unit 1222, a video processing unit 1228, and an audio processing unit 1232. In another embodiment, the computer system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 embodying any one or more of the methodologies of functions described herein. The instructions 1226 may also reside, completely or at least partially, within the main memory 1204 and/or within the processing device 1202 during execution thereof by the computer system 1200; the main memory 1204 and the processing device 1202 also constituting computer-readable storage media.

The computer-readable storage medium 1224 may also be used to store instructions 1226 utilizing the error recovery logic, such as described with respect to FIGS. 1-6, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising an execution unit communicatively coupled to a memory, and an error recovery logic coupled to the execution unit. The error recovery logic is to detect a first error when a first memory location in the memory is accessed by the execution unit, initiate a recovery process to recover from the first error, detect a second error when a second memory location in the memory is accessed by the execution unit while the recovery process is being performed, determine whether the first memory location and the second memory location are in a range of memory locations, and continue the recovery process when the first memory location and the second memory location are in the range of memory locations.

Example 2 may optionally extend the subject matter of example 1. In example 2, the error recovery logic is further to halt the recovery process when one or more of the first memory location and the second memory location are not in the range of memory locations.

Example 3 may optionally extend the subject matter of examples 1-2. In example 3, the error recovery logic is to detect the first error by receiving a first indication from a device that the first error has occurred at the first memory location and the error recovery logic is to detect the second error by receiving a second indication from the device that the second error has occurred at the second memory location.

Example 4 may optionally extend the subject matter of examples 1-3. In example 4, the error recovery logic is to determine whether the first memory location and the second memory location are in the range of memory locations by determining the range of memory locations based on a starting memory location and a range indicator or determining multiple ranges of memory locations based on multiple starting memory locations and multiple range indicators.

Example 5 may optionally extend the subject matter of examples 1-4. In example 5, the error recovery logic is further to receive first data indicating the starting memory location and the range indicator from a component external to the processor.

Example 6 may optionally extend the subject matter of examples 1-5. In example 6, the first error comprises one or more of an error check code (ECC) error, a parity error, a system bus error, a cache error, or a translation lookaside buffer (TLB) error, etc.

Example 7 may optionally extend the subject matter of examples 1-6. In example 7, the recovery process is to record one or more of an address of first memory location, an identifier for an instruction that accessed the first memory location, or data stored in the first memory location.

Example 8 may optionally extend the subject matter of examples 1-7. In example 8, the range of memory locations comprises a plurality of consecutive memory locations.

Example 9 is a method comprising detecting a first error when a first memory location in a memory is accessed, initiating a recovery process to recover from the first error, detecting a second error when a second memory location in the memory is accessed while the recovery process is being performed, determining whether the first memory location and the second memory location are in a range of memory locations, and continuing the recovery process when the first memory location and the second memory location are in the range of memory locations.

Example 10 may optionally extend the subject matter of example 9. In example 10, the method further comprises halting the recovery process when one or more of the first memory location and the second memory location are not in the range of memory locations.

Example 11 may optionally extend the subject matter of examples 9-10. In example 11, detecting the first error comprises receiving a first indication from a device that the first error has occurred at the first memory location and detecting the second error comprises receiving a second indication from the device that the second error has occurred at the second memory location.

Example 12 may optionally extend the subject matter of examples 9-11. In example 12, determining whether the first memory location and the second memory location are in the range of memory locations comprises determining the range of memory locations based on a starting memory location and a range indicator or determining multiple ranges of memory locations based on multiple starting memory locations and multiple range indicators.

Example 13 may optionally extend the subject matter of examples 9-12. In example 13, the method further comprises receiving first data indicating the starting memory location and the range indicator from a component external to a processor.

Example 14 may optionally extend the subject matter of examples 9-13. In example 14, the first error comprises one or more of an error check code (ECC) error, a parity error, a system bus error, a cache error, or a translation lookaside buffer (TLB) error, etc.

Example 15 may optionally extend the subject matter of examples 9-14. In example 15, the recovery process is to record one or more of an address of first memory location, an identifier for an instruction that accessed the first memory location, or data stored in the first memory location.

Example 16 may optionally extend the subject matter of examples 9-15. In example 16, the range of memory locations comprises a plurality of consecutive memory locations.

Example 17 is a non-transitory machine-readable storage medium including data that, when accessed by a processor, cause the processor to perform operations comprising detecting a first error when a first memory location in a memory is accessed, initiating a recovery process to recover from the first error, detecting a second error when a second memory location in the memory is accessed while the recovery process is being performed, determining whether the first memory location and the second memory location are in a range of memory locations, and continuing the recovery process when the first memory location and the second memory location are in the range of memory locations.

Example 18 may optionally extend the subject matter of example 17. In example 18, the operations further comprise halting the recovery process when one or more of the first memory location and the second memory location are not in the range of memory locations.

Example 19 may optionally extend the subject matter of examples 17-18. In example 19, detecting the first error comprises receiving a first indication from a device that the first error has occurred at the first memory location and wherein detecting the second error comprises receiving a second indication from the device that the second error has occurred at the second memory location.

Example 20 may optionally extend the subject matter of examples 17-19. In example 20, determining whether the first memory location and the second memory location are in the range of memory locations comprises determining the range of memory locations based on a starting memory location and a range indicator, or determining multiple ranges of memory locations based on multiple starting memory locations and multiple range indicators.

Example 21 may optionally extend the subject matter of examples 17-20. In example 21, the operations further comprise receiving first data indicating the starting memory location and the range indicator from a component external to the processor.

Example 22 may optionally extend the subject matter of examples 17-20. In example 22, the first error comprises one or more of an error check code (ECC) error, a parity error, a system bus error, a cache error, or a translation lookaside buffer (TLB) error, etc.

Example 23 may optionally extend the subject matter of examples 17-22. In example 23, the recovery process is to record one or more of an address of first memory location, an identifier for an instruction that accessed the first memory location, or data stored in the first memory location.

Example 24 may optionally extend the subject matter of examples 17-23. In example 24, the range of memory locations comprises a plurality of consecutive memory locations.

Example 25 is an apparatus comprising means for detecting a first error when a first memory location in a memory is accessed, means for initiating a recovery process to recover from the first error, means for detecting a second error when a second memory location in the memory is accessed while the recovery process is being performed, means for determining whether the first memory location and the second memory location are in a range of memory locations, and means for continuing the recovery process when the first memory location and the second memory location are in the range of memory locations.

Example 26 may optionally extend the subject matter of example 25. In example 26, the apparatus further comprises means for halting the recovery process when one or more of the first memory location and the second memory location are not in the range of memory locations.

Example 27 may optionally extend the subject matter of examples 25-26. In example 27, detecting the first error comprises receiving a first indication from a device that the first error has occurred at the first memory location and wherein detecting the second error comprises receiving a second indication from the device that the second error has occurred at the second memory location.

Example 28 may optionally extend the subject matter of examples 25-27. In example 28, determining whether the first memory location and the second memory location are in the range of memory locations comprises determining the range of memory locations based on a starting memory location and a range indicator, or determining multiple ranges of memory locations based on multiple starting memory locations and multiple range indicators.

Example 29 may optionally extend the subject matter of examples 25-28. In example 29, the apparatus further comprises means for receiving first data indicating the starting memory location and the range indicator from a component external to a processor.

Example 30 may optionally extend the subject matter of examples 25-29. In example 30, the first error comprises one or more of an error check code (ECC) error, a parity error, a system bus error, a cache error, or a translation lookaside buffer (TLB) error, etc.

Example 31 may optionally extend the subject matter of examples 25-30. In example 31, the recovery process is to record one or more of an address of first memory location, an identifier for an instruction that accessed the first memory location, or data stored in the first memory location.

Example 32 may optionally extend the subject matter of examples 25-31. In example 32, the range of memory locations comprises a plurality of consecutive memory locations.

Example 33 is at least one machine readable medium comprising a plurality of instructions that in response to being executed on a computing device, cause the computing device to carry out a method according to any one of examples 9-16.

Example 34 is an apparatus comprising means for performing the method of any one of examples 9-16.

Example 35 is a system comprising a memory to store data and a processor communicatively coupled to the memory, the processor to detect a first error when a first memory location in the memory is accessed by the processor, initiate a recovery process to recover from the first error, detect a second error when a second memory location in the memory is accessed by the processor while the recovery process is being performed, determine whether the first memory location and the second memory location are in a range of memory locations, and continue the recovery process when the first memory location and the second memory location are in the range of memory locations.

Example 36 may optionally extend the subject matter of example 35. In example 31, the processor is further to halt the recovery process when one or more of the first memory location and the second memory location are not in the range of memory locations.

Example 37 may optionally extend the subject matter of examples 35-36. In example 37, the processor is to detect the first error by receiving a first indication from a device that the first error has occurred at the first memory location and wherein the processor is to detect the second error by receiving a second indication from the device that the second error has occurred at the second memory location.

Example 38 may optionally extend the subject matter of examples 35-37. In example 38, the processor is to determine whether the first memory location and the second memory location are in the range of memory locations by determining the range of memory locations based on a starting memory location and a range indicator, or determining multiple ranges of memory locations based on multiple starting memory locations and multiple range indicators.

Example 39 may optionally extend the subject matter of examples 35-38. In example 39, the processor is further to receive first data indicating the starting memory location and the range indicator from a component external to the processor.

Example 40 may optionally extend the subject matter of examples 35-49. In example 40, the first error comprises one or more of an error check code (ECC) error, a parity error, a system bus error, a cache error, or a translation lookaside buffer (TLB) error, etc.

Example 41 may optionally extend the subject matter of examples 35-42 In example 41, the recovery process is to record one or more of an address of first memory location, an identifier for an instruction that accessed the first memory location, or data stored in the first memory location.

Example 42 may optionally extend the subject matter of examples 35-41. In example 42, the range of memory locations comprises a plurality of consecutive memory locations.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A hardware processor comprising:
   an execution unit communicatively coupled to a memory; and error recovery logic coupled to the execution unit, the error recovery logic to:
      detect a first error within a first memory location accessed by the execution unit;
      initiate a recovery process to recover from at least the first error, wherein the initiated recovery process is for a determined range of memory locations comprising the first memory location;
      detect a second error within a second memory location accessed by the execution unit;
      determine whether the first memory location and the second memory location are in the determined range of memory locations for the initiated recovery process;
      continue the recovery process in response to the first memory location and the second memory location being in the determined range of memory locations; and
      halt the initiated recovery process for the first error within the first memory location in response to the second error within the second memory location occurring outside of the determined range of memory locations, wherein the second error is recoverable.

2. The hardware processor of claim 1, wherein the error recovery logic is to detect the first error by receiving a first indication from a device that the first error has occurred at the first memory location and wherein the error recovery logic is to detect the second error by receiving a second indication from the device that the second error has occurred at the second memory location.

3. The hardware processor of claim 1, wherein the error recovery logic is to determine whether the first memory location and the second memory location are in the range of memory locations by the error recovery logic further to:
   determine the range of memory locations based on a starting memory location and a range indicator; or
   determine multiple ranges of memory locations based on multiple starting memory locations and multiple range indicators.

4. The hardware processor of claim 3, wherein the error recovery logic is further to receive first data indicating the starting memory location and the range indicator from a component external to the hardware processor.

5. The hardware processor of claim 1, wherein the first error comprises one or more of an error check code (ECC) error, a parity error, a system bus error, a cache error, or a translation lookaside buffer (TLB) error, etc.

6. The hardware processor of claim 1, wherein the recovery process is to record one or more of an address of first memory location, an identifier for an instruction that accessed the first memory location, or data stored in the first memory location.

7. The hardware processor of claim 1, wherein the range of memory locations comprises a plurality of consecutive memory locations.

8. A method comprising:
   detecting, using a processing device, a first error within a first memory location in a memory device;
   initiating, using the processing device, a recovery process to recover from at least the first error, wherein the initiated recovery process is for a determined range of memory locations comprising the first memory location:
   detecting a second error within a second memory location in the memory device;
   determining, using the processing device, whether the first memory location and the second memory location are in the determined range of memory locations for the initiated recovery process:
   continuing the recovery process in response to the first memory location and the second memory location being in the determined range of memory locations; and
   halting the initiated recovery process for the first error within the first memory location in response to the second error within the second memory location occurring outside of the determined range of memory locations, wherein the second error is recoverable.

9. The method of claim 8, wherein detecting the first error comprises receiving a first indication from a device that the first error has occurred at the first memory location and wherein detecting the second error comprises receiving a second indication from the device that the second error has occurred at the second memory location.

10. The method of claim 8, wherein determining whether the first memory location and the second memory location are in the range of memory locations comprises:
   determining the range of memory locations based on a starting memory location and a range indicator; or
   determining multiple ranges of memory locations based on multiple starting memory locations and multiple range indicators.

11. The method of claim 10, further comprising receiving first data indicating the starting memory location and the range indicator from a component external to a processor.

12. The method of claim 8, wherein the recovery process is to record one or more of an address of first memory location, an identifier for an instruction that accessed the first memory location, or data stored in the first memory location.

13. A system comprising:
a memory to store data; and
a hardware processor communicatively coupled to the memory, the hardware processor to:
detect a first error within a first memory location accessed by the hardware processor;
initiate a recovery process to recover from at least the first error, wherein the initiated recovery process is for a determined range of memory locations comprising the first memory location;
detect a second error within a second memory location accessed by the hardware processor;
determine whether the first memory location and the second memory location are in the determined range of memory locations;
continue the recovery process in response to the first memory location and the second memory location being in the determined range of memory locations; and
halt the initiated recovery process for the first error within the first memory location in response to the second error within the second memory location occurring outside of the determined range of memory locations, wherein the second error is recoverable.

14. The system of claim 13, wherein the hardware processor is to detect the first error by receiving a first indication from a device that the first error has occurred at the first memory location and wherein the hardware processor is to detect the second error by receiving a second indication from the device that the second error has occurred at the second memory location.

15. The system of claim 13, wherein the hardware processor is to determine whether the first memory location and the second memory location are in the range of memory locations by the hardware processor further to:
determine the range of memory locations based on a starting memory location and a range indicator; or
determine multiple ranges of memory locations based on multiple starting memory locations and multiple range indicators.

16. The system of claim 15, wherein the hardware processor is further to receive first data indicating the starting memory location and the range indicator from a component external to the hardware processor.

17. The system of claim 13, wherein the recovery process is to record one or more of an address of first memory location, an identifier for an instruction that accessed the first memory location, or data stored in the first memory location.

* * * * *